United States Patent
Vignotto et al.

(10) Patent No.: US 7,488,046 B2
(45) Date of Patent: Feb. 10, 2009

(54) HUB-BEARING ASSEMBLY ALLOWING PRESSURIZED AIR TO BE SUPPLIED TO THE TIRE OF A MOTOR VEHICLE WHEEL

(75) Inventors: Angelo Vignotto, Turin (IT); Claudio Savarese, Airasca (IT); Patrick Le Reun, Buttigliera Alta (IT); Fulvio Nicastri, Garzigliana (IT)

(73) Assignee: Aktiebolaget SKF, Gothenburg (SE)

( * ) Notice: Subject to any disclaimer, the term of this patent is extended or adjusted under 35 U.S.C. 154(b) by 230 days.

(21) Appl. No.: 11/477,329

(22) Filed: Jun. 28, 2006

(65) Prior Publication Data

US 2007/0012390 A1  Jan. 18, 2007

(30) Foreign Application Priority Data

Jun. 28, 2005  (EP) .................. 05105756

(51) Int. Cl.
*B60B 27/00* (2006.01)
*B60C 23/10* (2006.01)

(52) U.S. Cl. .................. 301/108.1; 152/415

(58) Field of Classification Search ... 301/108.1–108.3; 152/415–417
See application file for complete search history.

(56) References Cited

U.S. PATENT DOCUMENTS

| 4,190,133 | A | * | 2/1980 | Ploeger | .................. 301/108.1 |
|---|---|---|---|---|---|
| 5,011,233 | A | * | 4/1991 | Nomura et al. | .......... 301/108.1 |
| 5,195,807 | A | * | 3/1993 | Lederman | ................ 301/108.1 |
| 5,221,381 | A | | 6/1993 | Hurrell, II | |
| 5,584,949 | A | | 12/1996 | Ingram | |
| 5,642,946 | A | | 7/1997 | Caillault et al. | |
| 5,997,182 | A | * | 12/1999 | Brown | ........................ 384/448 |
| 6,260,595 | B1 | * | 7/2001 | Cobb | ......................... 152/417 |
| 6,425,427 | B1 | * | 7/2002 | Stech | ......................... 152/417 |
| 7,207,365 | B2 | * | 4/2007 | Nelson et al. | ............... 152/417 |
| 2002/0139463 | A1 | | 10/2002 | Cobb | |
| 2004/0169415 | A1 | * | 9/2004 | Kapaan et al. | ........... 301/105.1 |

FOREIGN PATENT DOCUMENTS

EP  0 362 921 A2  4/1990

\* cited by examiner

*Primary Examiner*—Jason R Bellinger
(74) *Attorney, Agent, or Firm*—Merchant & Gould P.C.

(57) ABSTRACT

A hub-bearing unit (10) has a rotatable outer race (30) fixable to a wheel and an inner stationary hub (20) forming a passage (27) for pressurized air coming from a source of pressurized air mounted onboard of a vehicle. Tightly fitted on the axially outer side of the unit (10) is a cylindrical cover (50) defining with the unit (10) an airtight chamber (51) communicating with the passage (27). The cover (50) has a through bore (55) for establishing air communication between the chamber (51) and a tube (A, B) for conveying pressurized air to the tire. The cover has an outer wall (52) with a cylindrical portion (52*b*) axially protruding beyond the hub-bearing unit (10) so as to provide a cylindrical surface for centering the wheel of the vehicle.

13 Claims, 1 Drawing Sheet

HUB-BEARING ASSEMBLY ALLOWING PRESSURIZED AIR TO BE SUPPLIED TO THE TIRE OF A MOTOR VEHICLE WHEEL

BACKGROUND OF THE INVENTION

The present invention refers to a hub-bearing assembly allowing pressurized air to be supplied to the tire of a motor vehicle wheel.

There are known hub-bearing units allowing to inflate air pressurized by a source of pressurized air mounted on board of the vehicle to the tire in order to adjust and/or monitor the air pressure of the tires.

In some known solutions, as for example in U.S. Pat. No. 5,642,946 and EP-A-0 362 921, radial bores are formed in the outer and inner races of the bearing for allowing pressurized air to pass to the rotating part of the hub-bearing assembly. Forming such bores involves a constructional complication which may adversely affect the bearing raceways, which—as known—are made of hardened steel and have very low admissible tolerances.

In other known solutions, as for example in U.S. Pat. No. 5,221,381, air is conveyed to the wheel through an axial bore formed in the rotating hub.

In both the above-mentioned cases, pressurized air is let into the hub-bearing assembly very near the rolling bodies. It is therefore necessary to fit special high duty sealing devices preventing pressurized air from penetrating directly into the inner part of the bearing, where the lubricating grease for lubricating the rolling parts is contained. The sealing devices are expensive and develop considerable friction. Moreover, the passage of pressurized air through the bearing can shorten considerably its life, in case the above-mentioned sealing devices should be or become faulty. In addition, the sealing devices are normally mounted proximate to the bearing raceways, and therefore have to be miniaturized due to the available space, that is minimum in those zones.

U.S. Pat. No. 5,584,949 discloses a system for inflating air to the tires through the axle of the wheels of a trailer. A threaded ring, constituting an airtight barrier, is screwed onto the end of the axle.

In view of the foregoing state of the art, it is a general object of the present invention to inflate pressurized air to a hub-bearing assembly, avoiding the problems concerning the formation of bores of the passage of air near the bearing raceways.

SUMMARY OF THE INVENTION

A particular object of the invention is to protect from crushes those components of the system (tubes, connectors) that conveys pressurized air from the hub-bearing unit to the wheel rim. More particularly, this object is to be attained in a simple and cheap manner, and without increasing significantly the axial bulk of the hub-bearing unit.

A further object of the invention is to provide, in a cost-effective manner, a surface for centering the wheel and, optionally, also a brake rotor associated with the wheel.

These and other objects and advantages, that will be better understood in the following, are accomplished according to the invention by a hub-bearing assembly having the features defined in the appended claims.

BRIEF DESCRIPTION OF THE DRAWINGS

A preferred, but not limiting embodiment of the invention will now be described, reference being made to the accompanying drawings, in which.

DETAILED DESCRIPTION

Figure 1:
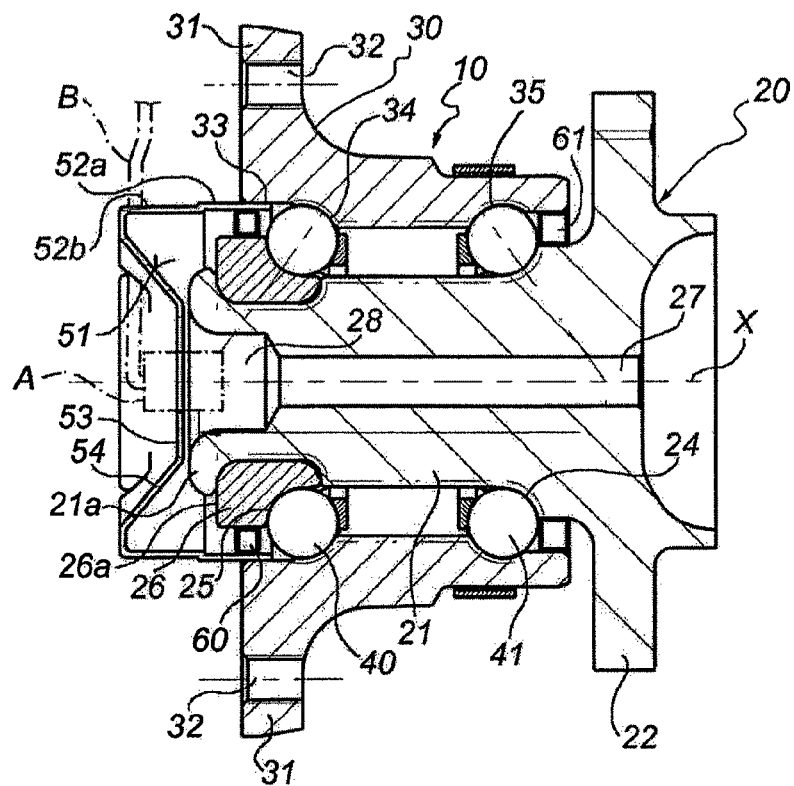
FIG. 1 is an axial cross-sectional view of a hub-bearing assembly according to the invention.

Referring initially to FIG. 1, numeral 10 indicates overall a hub-bearing unit for a non-driven wheel of a vehicle of the kind equipped with a system for supplying pressurized air to the tires of its wheels. Unit 10 comprises a flanged, non-rotatable and radially inner hub 20, a rotatable and radially outer flanged race 30, and a dual set of rolling bodies 40, 41 (in this example balls) radially interposed between the hub 20 and the outer race 30.

The outer race 30 forms a radial flange 31 extending in a radially outer direction with seal bores 32 for wheel fastening bolts (not shown), and an inner cylindrical surface 33 that opens on the axially outer side of the unit 10. Furthermore, outer raceways 34, 35 for the rolling bodies 40, 41 are formed in the outer race 30.

The hub 20 forms a tubular axial portion 21 and a flange 22 which extends in a radially outer direction in order to fix the unit 10 to a suspension standard (not shown) of the vehicle. One of the radially inner raceways 24 for the rolling bodies 41 is formed directly in the outer cylindrical surface of the tubular portion 21, whereas another radially inner raceway 25 for the rolling bodies 40 is formed by an annular element 26 that is fitted onto tubular portion 21. The end part of this, that protrudes axially beyond the annular element 26, is cold formed, preferably by rolling, in a radially outer direction against the axially outer face 26a of the annular element 26 so as to form a plastically deformed edge 21a. The deformed edge 21a locks the annular element 26 on the stationary hub 20 and axially preloads the hub-bearing unit 10.

Figure 2:
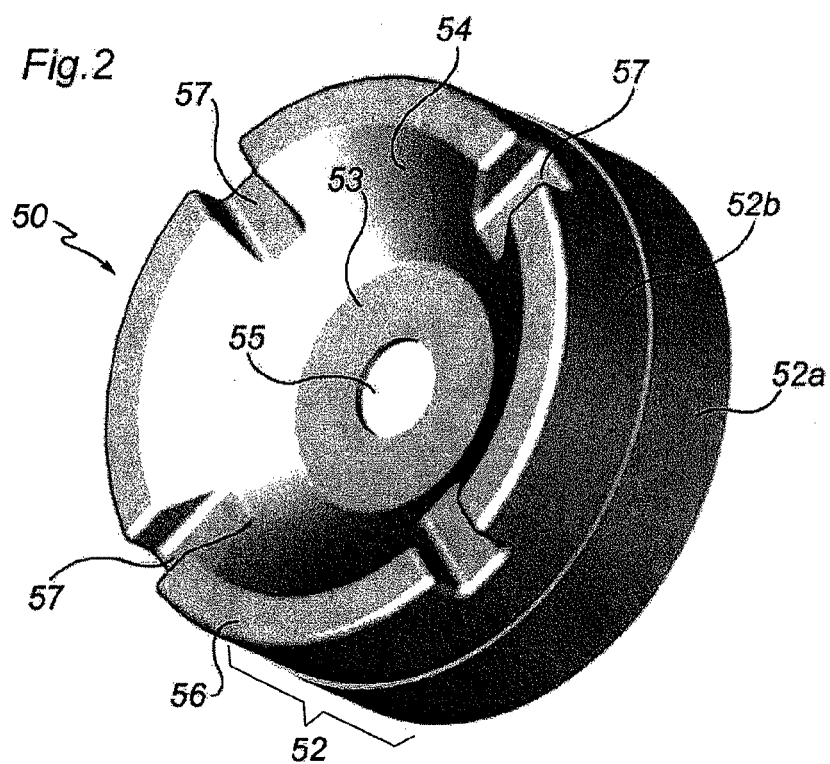
FIG. 2 is an enlarged perspective view of a cover being part of the assembly of FIG. 1.

A cover 50 of overall cylindrical shape, described in detail hereinafter and shown separately in FIG. 2, is tightly locked in the cylindrical surface 33 of the outer race 30, so as to define an airtight chamber 51 with the unit 10.

Formed centrally in the tubular portion 21 of the hub 20 is an axial air passage 27 through which pressurized air coming from a source of pressurized air (not shown) mounted on board of the vehicle reaches chamber 51.

The cover 50 forms a cylindrical wall 52 and a radial wall 53 joined to the cylindrical wall 52 by a conical wall 54. The radial wall 53 has a central bore 55 in which there is tightly fitted a connector or tubular joint A (possibly a valve connector) that connects the chamber 51 to a tube B for conveying air from the chamber 51 to the wheel rim and finally the tire. In this way, the connector A lies on the axis of rotation x of the unit 10, and therefore is not subjected to considerable centrifugal forces.

The cylindrical wall 52 of the cover 50 comprises a first cylindrical portion 52a tightly fitted, preferably forcedly fitted, in the cylindrical surface 33 of the outer race 30, and a second cylindrical portion 52b, axially outer of the first portion 52a and having an outer diameter smaller than this. The first cylindrical portion 52a provides a centering surface for a brake disc (not shown), whereas the second cylindrical portion 52b acts as a surface for centering the wheel (not shown).

On the axially outer side of the assembly, between the annular stationary element 26 and the cylindrical portion 52a of the cover 50, there is interposed an annular sealing device 60 for containing the lubricant grease within the inner parts of the bearing and preventing pressurized air from leaking out of the chamber 51 into the inside of the bearing. Mounted on the axially inner side of the unit 10 is a standard and cheaper annular sealing device 61, which is not required to perform any sealing action against pressurized air.

Still referring to FIG. 1, the walls 52b and 54 are joined by an annular edge 56 axially protruding beyond the connector A. In other words, that part of the connector A located on the axially outer side of the radial wall 53 is housed in a radial recess formed by the walls 53, 54 and the edge 56. The connector A is so fitted and protected within the space 28, normally not used, at the center of the axially outer end 21a of the hub.

As better shown in FIG. 2, formed in the protruding edge 56 is at least one radial channel or passage 57 that allows the passage of the air tube B, in such a manner that this tube does not significantly project beyond the edge 56 in the axial direction. Owing to this arrangement, the tube B and the connector A are protected from crashes coming from the outside, for example in case the hub crashes against a kerb. In the preferred embodiment shown in the drawings, the cover forms a plurality of radial valleys or channels 57 angularly equally spaced in order to facilitate a correct positioning of the tube B when assembling or re-assembling the assembly.

The cover 50 is preferably a single piece made of sheet metal treated with an anti-corrosion product, so as to prevent the formation of rust incrustations which could make the removal of the wheel from the assembly difficult.

Still referring to FIG. 1, the walls 52b and 54 are joined by an annular edge 56 axially protruding beyond the connector A. In other words, that part of the connector A located on the axially outer side of the radial wall 53 is housed in a radial recess formed by the walls 53, 54 and the edge 56. The connector A is so fitted and protected within the space 28, normally not used, at the center of the axially outer end 21a of the hub.

The invention is not intended to be limited to the embodiment described and illustrated herein, which should be considered as an example of an embodiment of the hub-bearing assembly according to the invention. Rather, the invention may be modified with regard to the shape of arrangement of parts, constructional and functional details, as will be apparent to those skilled in the art. For example, the hub-bearing unit may be of the kind with balls and/or rollers, possibly with raceways having different diameters for two sets of rolling bodies. Finally, the channels conveying pressurized air from the hub to the tire may comprise valves, connectors, hoses, and conduits obtained within the wheel or a separate element mounted thereon.

What is claimed is:

1. A hub-bearing assembly for the wheel of a vehicle of the kind equipped with a system for supplying pressurized air to the tires, the assembly comprising: a hub-bearing unit having a rotatable radially outer race fixable to a wheel, a stationary radially inner hub defining at least one passage for pressurized air coming from a source of pressurized air mounted onboard the vehicle; a cover of substantially cylindrical shape secured to the rotatable radially outer race on an axially outer side of the unit and defining with the unit an airtight chamber communicating with the passage, the cover having a through bore for establishing an air communication between the chamber and at least one channel for conveying pressurized air to the tire, and an outer, axial cylindrical wall having a cylindrical portion axially protruding beyond the hub-bearing unit so as to provide a cylindrical surface for centering the wheel of the vehicle.

2. A hub-bearing assembly according to claim 1, wherein the radially inner hub has a tubular axial portion, and the pressurized air passage is an axial passage formed in the tubular portion.

3. A hub-bearing assembly for the wheel of a vehicle of the kind equipped with a system for supplying pressurized air to the tires, the assembly comprising: a hub-bearing unit having a rotatable member fixable to a wheel, a stationary member defining at least one passage for pressurized air coming from a source of pressurized air mounted onboard the vehicle; a cover of substantially cylindrical shape secured to the rotatable member on an axially outer side of the unit and defining with the unit an airtight chamber communicating with the passage, the cover having a through bore for establishing an air communication between the chamber and at least one channel for conveying pressurized air to the tire, and an outer, axial cylindrical wall having a cylindrical portion axially protruding beyond the hub-bearing unit so as to provide a cylindrical surface for centering the wheel of the vehicle, wherein the outer cylindrical axial wall comprises a further cylindrical portion axially adjacent to the cylindrical portion, wherein the further cylindrical portion is fixed to a cylindrical surface of the rotatable member, and partly projects axially beyond the rotatable member, so as to provide a cylindrical surface for centering a brake rotor.

4. A hub-bearing assembly according to claim 3, wherein the further cylindrical portion for centering a brake rotor has an outer diameter being greater than that of the cylindrical portion for centering the wheel.

5. A hub-bearing assembly according to claim 3, wherein a part of the further cylindrical portion is fitted within a cylindrical cavity of the rotatable member.

6. A hub-bearing assembly according to claim 5, comprising a single annular sealing device capable of performing sealing action against pressurized air, wherein the sealing device is radially interposed between the stationary member or an annular element integral with the stationary member, and the part of the further cylindrical portion of the cover fitted in the cylindrical cavity of the rotatable member.

7. A hub-bearing assembly according to claim 1, wherein the through bore is formed in a radially central position in the cover.

8. A hub-bearing assembly according to claim 1, wherein the through bore is formed centrally in a substantially radial wall of the cover.

9. A hub-bearing assembly for the wheel of a vehicle of the kind equipped with a system for supplying pressurized air to the tires, the assembly comprising: a hub-bearing unit having a rotatable member fixable to a wheel, a stationary member defining at least one passage for pressurized air coming from a source of pressurized air mounted onboard the vehicle; a cover of substantially cylindrical shape secured to the rotatable member on an axially outer side of the unit and defining with the unit an airtight chamber communicating with the passage, the cover having a through bore for establishing an air communication between the chamber and at least one channel for conveying pressurized air to the tire, and an outer, axial cylindrical wall having a cylindrical portion axially protruding beyond the hub-bearing unit so as to provide a cylindrical surface for centering the wheel of the vehicle, the cover forming on an axially outer side of the assembly, an axial recess with the through bore for accommodating and protecting a connection for establishing air communication between the chamber and a tube for conveying pressurized air to the tire, wherein the cover forms one or more edge portions axially protruding outwardly around said axial recess, so as to protect the connection from external crashes, and wherein the axially protruding edge of the cover forms at least one substantially radial valley or passage for allowing the passage of the air tube.

10. A hub-bearing assembly according to claim 9, wherein the axially protruding edge of the cover forms a plurality of substantially radial valleys or passages angularly spaced from one another.

11. A hub-bearing assembly according to claim 1, wherein the cover is formed by a single piece of sheet metal.

12. A hub-bearing assembly according to claim 11, wherein the sheet metal is treated with an anti-corrosion product.

13. A hub-bearing assembly according to claim 1, wherein the unit is a hub-bearing unit for a non-driven wheel of a motor vehicle.

* * * * *